United States Patent [19]

Di Duca

[11] Patent Number: 4,614,584
[45] Date of Patent: Sep. 30, 1986

[54] DISTRIBUTOR BOX FOR SEPTIC TANK SYSTEMS

[76] Inventor: Mark B. Di Duca, 1590 Young Ave., Paradise, Calif. 95969

[21] Appl. No.: 700,808

[22] Filed: Feb. 11, 1985

[51] Int. Cl.⁴ ............................................. B01D 35/30
[52] U.S. Cl. .................................. 210/422; 210/451; 210/455; 210/459; 210/532.2; 137/236.1; 137/546
[58] Field of Search ............... 210/170, 279, 289, 307, 210/456, 519, 532.1, 533, 532.2, 422, 451, 455, 459; 137/236, 544, 546, 450, 550; 405/39, 40, 43, 44, 51, 52, 80, 74; 285/5

[56] References Cited

U.S. PATENT DOCUMENTS

| | | | |
|---|---|---|---|
| 246,003 | 8/1881 | Goldmann | 210/422 |
| 460,984 | 10/1891 | McCutcheon | 210/422 |
| 1,434,337 | 10/1922 | Greenfield | 405/74 |
| 1,641,469 | 9/1927 | Baker | 210/532.2 |
| 2,355,305 | 8/1944 | Koenig | 210/519 |
| 3,051,317 | 8/1962 | Muth | 210/456 |
| 3,916,565 | 11/1975 | Runyon | 405/43 |
| 3,919,848 | 11/1975 | Sullivan | 405/43 |
| 4,206,055 | 6/1980 | Hauk et al. | 210/456 |
| 4,319,998 | 3/1982 | Anderson | 210/532.2 |

*Primary Examiner*—Richard V. Fisher
*Assistant Examiner*—Wanda L. Millard
*Attorney, Agent, or Firm*—James D. Givnan, Jr.

[57] ABSTRACT

A box-like structure which receives effluent from a septic tank which enters the structure above a removable horizontal screen which screens out larger sized solids. A settling chamber below the screen permits smaller solids to precipitate out of the effluent. A series of outlets are in each side wall of the box-like structure and are located so as to discharge effluent from the top of the settling chamber.

3 Claims, 3 Drawing Figures

DISTRIBUTOR BOX FOR SEPTIC TANK SYSTEMS

BACKGROUND OF THE INVENTION

The present invention pertains generally to septic tank systems and particularly to a distributor box having a settling chamber and from which a flow is apportioned to several outlet lines.

A problem exists in septic tank systems in that such systems have a life span which is severely reduced by a disproportionate flow to one or more drain lines. In an optimum system and equal flow is apportioned to each drain line which, in reality, is seldom achieved.

A second problem resulting in the shortened life of a septic tank system is the discharge of solids which ultimately clog the passageways leading into the drain field. Such clogging reduces the effective drain field area to impose a greater burden on the remaining lines.

The cost of re-laying drains in a septic tank system is a significant cost to the typical homeowner.

SUMMARY OF THE PRESENT INVENTION

The present invention is embodied in a distributor box which receives effluent from a septic tank and directs same after treatment to the buried drain lines of the system.

The distributor box of the present invention includes screening means which serves to trap solids above a certain size with provision made for periodic removal for cleaning. The distributor box is formed with an internal perimetrical shoulder on which the screen frame rests above a settling chamber. Outlets are located in upwardly spaced relationship to a box bottom wall to provide a chamber in which solids may gravitate to prevent them from entering the drain lines of the system.

Important objectives of the present distributor box and flow equalizing unit includes the provision of such a box located between a septic tank and its drain field lines to assure apportioning of tank discharge in an equal manner to the drain field lines; the provision of a distributor box which additionally serves to screen and precipitate solids received from a septic tank thereby contributing to the life of a drain field by virtually prohibiting the flow of solids to the drain lines; the provision of a distributor box of low cost construction which lends itself to incorporation into existing septic tank systems.

DETAILED DISCRIPTION OF THE PREFERRED EMBODIMENTS

Figure 1:
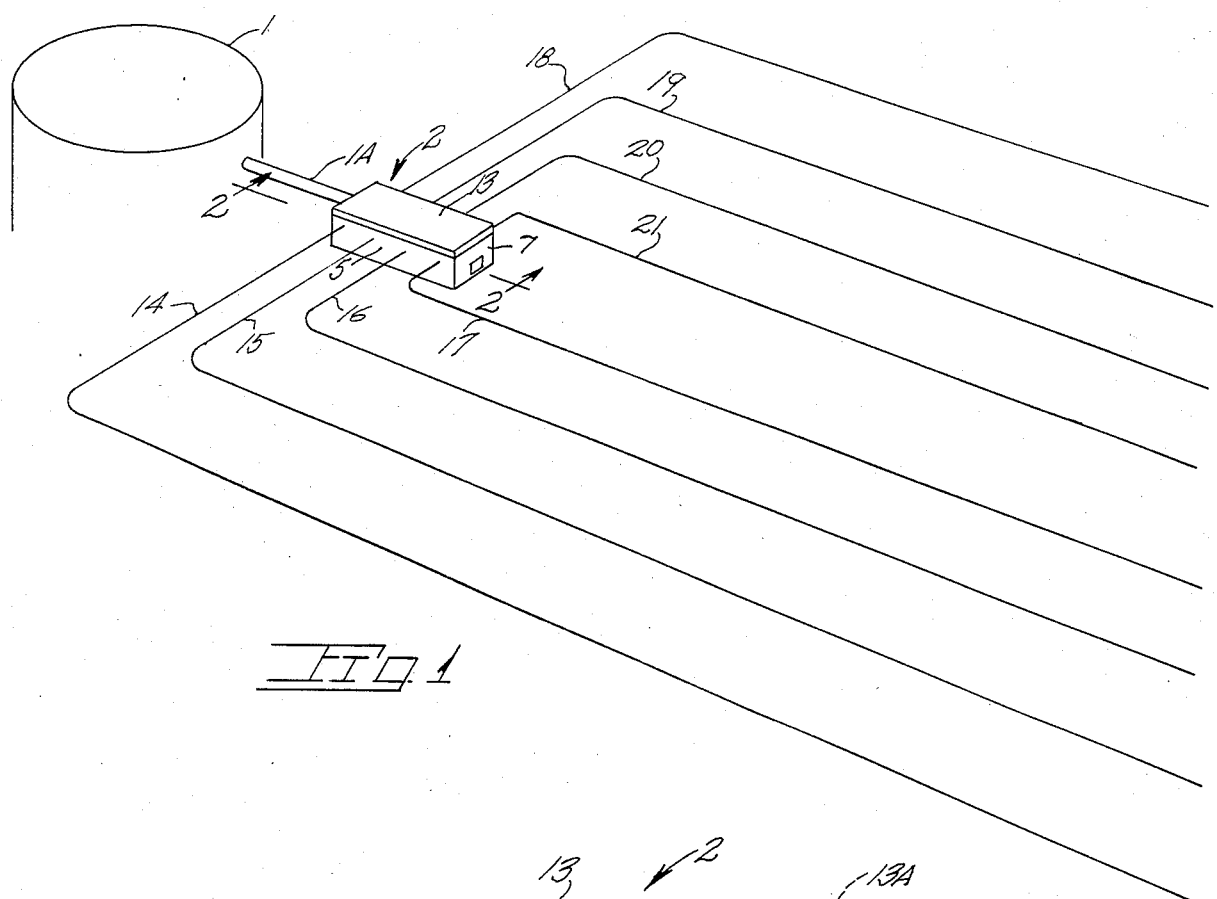
FIG. 1 is a perspective view of the present distributor box in place within a septic tank system shown schematically.
Figure 2:
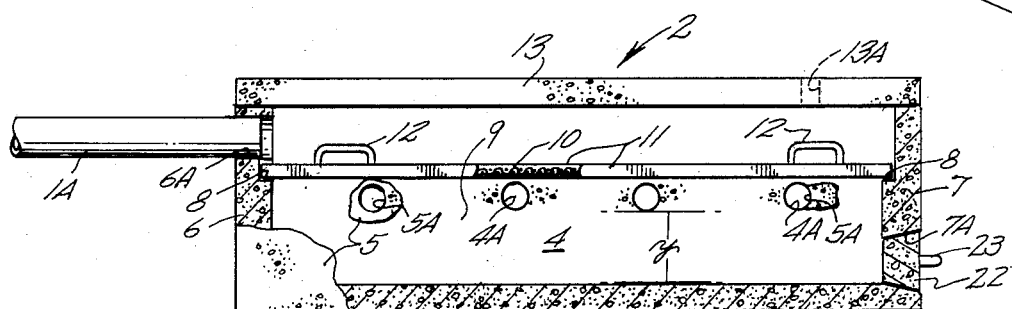
FIG. 2 is a vertical sectional view taken along line 2—2 of FIG. 1.
Figure 3:
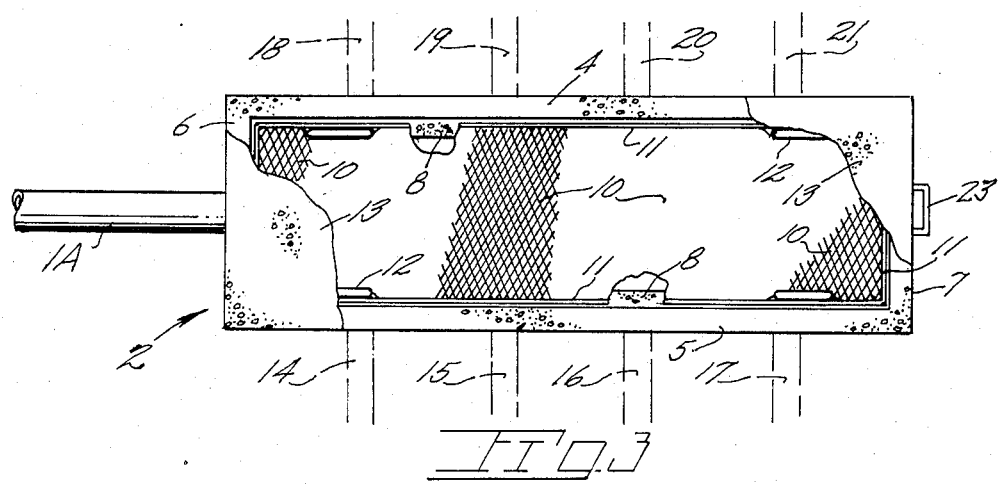
FIG. 3 is a plan view of the distributor box with lid fragments broken away to disclose internal components thereof.

With continuing attention to the drawing wherein applied reference numerals indicate parts similarly hereinafter identified, the reference numeral 1 indicates generally a septic tank having a discharge line 1A.

Indicated generally at 2 is the present distributor and flow equalizing box in communication with septic tank 1. The box 2 includes a bottom wall 3, a pair of side walls 4 and 5 with end walls at 6 and 7. End wall 6 is apertured at 6A to receive the discharge end of conduit 1A.

A shoulder at 8 formed about the internal side and end wall surfaces of the box and serves to support a screen 10 having an angle iron frame 11. The said screen is horizontally disposed in a plane below the end of conduit 1A. Handles at 12 on screen frame 11 facilitate periodic screen removal subsequent to removal of a box lid 13 vented at 13A.

Side walls 4 and 5 each define a series of discharge openings at 4A and 5A with both series being located in a horizontal plane subjacent screen 10. Preferably the openings 4A and 5A are immediately below the screen to provide a precipitation or settling chamber 9 having a depth of the vertical distance at y in which solids may accumulate. Accordingly, solids which settle within area 9 are prevented from entering the drain field through outlet lines 14 through 21.

End wall 7 is provided with a clean out opening 7A normally closed by a plug 22 equipped with a handgrip 23.

The distributor box functions to receive, treat and distribute septic tank effluent in a manner assuring an apportioned discharge through outlets 4A-5A. Initial separation of solids is by screen 10 hereafter area 9 of the box constitutes a settling chamber in which the small particles may precipitate. Screen 10 also serves to disperse the flow lengthwise along the box.

In a preferred embodiment of the present distributor box the outlet openings 4A-5A are located approximately one foot above bottom wall 3 to provide a settling chamber of adequate capacity. The outlet lines 14-21 may be drain pipe of one and one-half inch O.D. Suitable box dimensions are six feet in length, two feet deep and two feet four inches across.

While I have shown but one embodiment of the invention, it will be apparent to those skilled in the art that the invention may be embodied still otherwise without departing from the spirit and scope of the invention.

Having thus described the invention, what is desired to be secured in Letters Patent is:

1. A distributor box with settling chamber for a septic tank system having a septic tank and a multitude of drain lines, said distributor box serving to apportion a septic tank discharge flow to the drain lines, said distributor box comprising, a box structure including side, end and bottom walls, a removable closure, said side walls each having a series of outlet openings at a uniform distance above the box structure bottom wall, to each serve one of said drain lines, said side and end walls having shoulders, a screen including a frame in horizontal rested placement on said shoulders in a plane above said outlet openings and below a plane containing a box structure inlet opening whereby effluent discharged from said inlet opening will be deposited on said screen to remove solids above a predetermined size, said screen extending substantially the length of said box structure and serving to disperse effluent along the box structure for uniform distribution to the series of outlet openings, and a settling chamber extending the length of said box structure with the upper limit of the chamber being immediately below said outlet openings whereby certain solids are prevented from entry into the drain lines.

2. The distribution box claimed in claim 1 wherein said screen includes handles located at intervals along said frame for facilitating periodic removal and cleaning of the screen.

3. The distribution box claimed in claim 2 wherein said outlet openings are upwardly spaced from said bottom wall approximately one foot to provide a settling chamber of adequate capacity for precipitated solids.

* * * * *